(12) United States Patent
Otani et al.

(10) Patent No.: US 11,009,893 B2
(45) Date of Patent: May 18, 2021

(54) FLYING VEHICLE TRACKING METHOD, FLYING VEHICLE IMAGE ACQUIRING METHOD, FLYING VEHICLE DISPLAYING METHOD AND FLYING VEHICLE GUIDING SYSTEM

(71) Applicant: TOPCON Corporation, Tokyo-to (JP)

(72) Inventors: Hitoshi Otani, Tokyo-to (JP); Daisuke Sasaki, Tokyo-to (JP); Nobuyuki Fukaya, Tokyo-to (JP); Takeshi Sasaki, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 0 days.

(21) Appl. No.: 15/438,947

(22) Filed: Feb. 22, 2017

(65) Prior Publication Data

US 2017/0248948 A1 Aug. 31, 2017

(30) Foreign Application Priority Data

Feb. 26, 2016 (JP) .............................. JP2016-035208

(51) Int. Cl.
*G05D 1/00* (2006.01)
*B64C 39/02* (2006.01)
(Continued)

(52) U.S. Cl.
CPC ........... *G05D 1/101* (2013.01); *B64C 39/024* (2013.01); *G01S 5/0027* (2013.01); *G01S 11/12* (2013.01);
(Continued)

(58) Field of Classification Search
CPC ........ G05D 1/0033; G06T 2207/10032; G06T 7/20; G06T 7/70; G01S 19/13;
(Continued)

(56) References Cited

U.S. PATENT DOCUMENTS 9,057,609 B2 * 6/2015 Yu ......................... G08G 5/0026
2011/0181872 A1 7/2011 Dold et al.
(Continued)

FOREIGN PATENT DOCUMENTS

| JP | 2009-523236 A | 6/2009 |
| JP | 2014-167413 A | 9/2014 |

(Continued)

*Primary Examiner* — Hunter B Lonsberry
*Assistant Examiner* — Mathew Franklin Gordon
(74) *Attorney, Agent, or Firm* — Nields, Lemack & Frame, LLC

(57) ABSTRACT

The invention provides a flying vehicle tracking method, which comprises an optical tracking in which a tracking light is projected to a retro-reflector of a flying vehicle with the retro-reflector, the tracking light is received, and a tracking of the flying vehicle is performed based on a light receiving result, and an image tracking in which an image of the flying vehicle is acquired, the flying vehicle is detected from the image, and the tracking of the flying vehicle is performed based on a detection result, wherein the optical tracking and the image tracking are executed in parallel with each other, and in a case where the flying vehicle cannot be tracked by the optical tracking, the optical tracking is returned based on the detection result of the image tracking.

10 Claims, 7 Drawing Sheets

(51) Int. Cl.
| | |
|---|---|
| *G06T 7/20* | (2017.01) |
| *G06T 7/70* | (2017.01) |
| *G08G 5/00* | (2006.01) |
| *H04N 5/232* | (2006.01) |
| *G05D 1/10* | (2006.01) |
| *G01S 17/42* | (2006.01) |
| *G01S 5/00* | (2006.01) |
| *G01S 17/66* | (2006.01) |
| *G01S 11/12* | (2006.01) |
| *G01S 19/42* | (2010.01) |
| *G01S 17/86* | (2020.01) |
| *G01S 19/13* | (2010.01) |

(52) U.S. Cl.
CPC .............. *G01S 17/42* (2013.01); *G01S 17/66* (2013.01); *G01S 17/86* (2020.01); *G01S 19/42* (2013.01); *G05D 1/0033* (2013.01); *G06T 7/20* (2013.01); *G06T 7/70* (2017.01); *G08G 5/0026* (2013.01); *G08G 5/0082* (2013.01); *H04N 5/2328* (2013.01); *H04N 5/23203* (2013.01); *H04N 5/23206* (2013.01); *H04N 5/23258* (2013.01); *H04N 5/23293* (2013.01); *H04N 5/23296* (2013.01); *B64C 2201/027* (2013.01); *B64C 2201/108* (2013.01); *B64C 2201/127* (2013.01); *B64C 2201/146* (2013.01); *G01S 19/13* (2013.01); *G06T 2207/10032* (2013.01)

(58) Field of Classification Search
CPC ............ B64C 2201/146; B64C 39/024; H04N 5/23296; H04N 5/23293; H04N 5/2328; H04N 5/23258; H04N 5/23206; H04N 5/23203; G08G 5/0082; G08G 5/0026
See application file for complete search history.

(56) References Cited

U.S. PATENT DOCUMENTS

| | | | |
|---|---|---|---|
| 2012/0075461 A1 | 3/2012 | Yu et al. | |
| 2014/0046589 A1* | 2/2014 | Metzler | ................. G01B 21/04 701/514 |
| 2014/0126778 A1* | 5/2014 | Yu | ......................... G06T 3/4038 382/104 |
| 2014/0240498 A1* | 8/2014 | Ohtomo | ................. B64D 47/08 348/144 |
| 2014/0371952 A1* | 12/2014 | Ohtomo | ................. B64C 39/024 701/2 |
| 2014/0379173 A1* | 12/2014 | Knapp | ................... G06Q 10/10 701/2 |
| 2015/0215516 A1* | 7/2015 | Dolgin | ............... H04N 5/23293 348/169 |
| 2015/0220085 A1 | 8/2015 | Ohtomo et al. | |

FOREIGN PATENT DOCUMENTS

| | | |
|---|---|---|
| JP | 2015-1450 A | 1/2015 |
| JP | 2015-145784 A | 8/2015 |

* cited by examiner

FLYING VEHICLE TRACKING METHOD, FLYING VEHICLE IMAGE ACQUIRING METHOD, FLYING VEHICLE DISPLAYING METHOD AND FLYING VEHICLE GUIDING SYSTEM

BACKGROUND OF THE INVENTION

The present invention relates to a flying vehicle tracking method, a flying vehicle image acquiring method, a flying vehicle displaying method and a flying vehicle guiding system for executing an autonomous flight of a small type unmanned air vehicle (UAV: Unmanned Air vehicle).

In recent years, with a progress of a UAV (Unmanned Air Vehicle), various types of apparatuses are installed on the UAV and the UAV is flown by remotely controlling or by autonomously flying and works as required are carried out. For instance, a camera for photogrammetry and a scanner are installed on the UAV, and a measurement is performed downward from above the sky or the measurement is performed at a place where no operator can enter. And, for a positional measurement of the UAV itself, a GPS (Global Positioning System) is installed on the UAV, and a position of the UAV is determined by the GPS.

When the UAV is flown autonomously, it is necessary to have a flight plan and a positional information for recognizing as to whether or not the UAV is flying according to the flight plan. For obtaining the positional information, the GPS has been conventionally used. However, under an environment where radio waves from a satellite cannot be received, or under an environmental condition where a construction becomes an obstacle such as a bridge, or the like, or under a condition where the UAV flies in a tunnel, it is not possible to perform an autonomous flight.

For such circumstances, as disclosed in the Japanese Patent Laid-open Publication No. 2015-1450, the present applicant proposes to use a measuring instrument which has an optical tracking function as a means to obtain a positional information in a case where the positional information cannot be obtained by the GPS.

A position measurement is performed while tracking a flying vehicle by a measuring instrument, for instance, a total station, and it is possible to perform an autonomous flight of a UAV based on a positional information obtained by the total station.

Conventionally, for tracking by the total station, a prism has been provided on an object to be measured (in this case, the UAV). The prism has been sighted by a telescope of the total station, and the prism has been tracked.

Although, the total station has a searching function to capture the prism again within a tracking range in a case where the prism deviates from the tracking range, while searching, the UAV has no positional information for the autonomous flight, and there may be a possibility which a flight becomes unstable.

SUMMARY OF THE INVENTION

It is an object of the present invention to provide a flying vehicle tracking method, a flying vehicle image acquiring method, a flying vehicle displaying method and a flying vehicle guiding system for obtaining a positional information of a small type unmanned air vehicle by a surveying instrument and for stabilizing an autonomous flight in a case where the small type unmanned air vehicle is flown autonomously according to the positional information of the surveying instrument.

To attain the object as described above, a flying vehicle tracking method according to the present invention comprises an optical tracking in which a tracking light is projected to a retro-reflector of a flying vehicle with the retro-reflector, the tracking light is received, and a tracking of the flying vehicle is performed based on a light receiving result, and an image tracking in which an image of the flying vehicle is acquired, the flying vehicle is detected from the image, and the tracking of the flying vehicle is performed based on a detection result, wherein the optical tracking and the image tracking are executed in parallel with each other, and in a case where the flying vehicle cannot be tracked by the optical tracking, the optical tracking is returned based on the detection result of the image tracking.

Further, in the flying vehicle tracking method according to the present invention, the flying vehicle has an inertial measurement unit, and in a case where the optical tracking and the image tracking cannot be performed, the flying vehicle moves to a last position tracked by the optical tracking or the image tracking based on a positional information obtained by the inertial measurement unit, and the image tracking or the optical tracking is returned.

Further, a flying vehicle image acquiring method according to the present invention comprises a position measuring instrument and a ground base station, wherein the position measuring instrument has a camera unit with a zoom function, acquires an image of a flying vehicle, and is capable of performing a distance measurement and an angle measurement and of tracking the flying vehicle via an optical system of the camera unit, wherein the ground base station controls a flight of the flying vehicle based on a measurement result of the position measuring instrument, and wherein the ground base station controls the camera unit based on the measurement result of the position measuring instrument and controls a magnification of an acquired image of the flying vehicle.

Further, a flying vehicle displaying method according to the present invention comprises a position measuring instrument and a ground base station, wherein the position measuring instrument has a camera unit, acquires an image of a flying vehicle, and is capable of performing a distance measurement and an angle measurement and of tracking the flying vehicle via an optical system of the camera unit, wherein the ground base station controls a flight of the flying vehicle based on a measurement result of the position measuring instrument, and wherein the ground base station includes a display unit for displaying an image photographed by the camera unit and displays the flying vehicle on the display unit so that a size of the flying vehicle will be constant on an image based on the measurement result of the position measuring instrument.

Further, in the flying vehicle displaying method according to the present invention, the image displayed on the display unit can be switched to a display of only the flying vehicle or a display including surroundings of the flying vehicle.

Further, in the flying vehicle displaying method according to the present invention, the camera unit has two zoom functions of an optical zoom and a digital zoom, wherein a magnification of the optical zoom is changed so that the size of the flying vehicle will be constant on the image corresponding to a measured distance, and a switching of the display of only the flying vehicle and the display including the surroundings of the flying vehicle is carried out by the digital zoom.

Further, a flying vehicle guiding system according to the present invention comprises a flying vehicle system capable of being remotely controlled, a position measuring instrument capable of performing a distance measurement and an angle measurement and of tracking the flying vehicle system, and a ground base station for controlling a flight of the flying vehicle system based on a measurement result of the position measuring instrument, wherein the flying vehicle system comprises a retro-reflector and a flying vehicle control device, wherein the position measuring instrument comprises a camera unit for sighting and photographing the flying vehicle system, a distance measuring unit for performing a prism measurement and a non-prism measurement via an optical system of the camera unit, angle detectors for detecting an angle in a sighting direction, and a measurement control unit, wherein the measurement control unit has a tracking control unit for performing an optical tracking by receiving a reflected light from the retro-reflector and for performing an image tracking by extracting the flying vehicle system from an image photographed by the camera unit, an image pickup control unit for controlling a photographing condition of the camera unit, a position measurement communication unit, and an image processing unit for detecting the flying vehicle system from the image acquired by the camera unit, wherein the ground base station has a control device and a base communication unit, wherein the measurement control unit executes the optical tracking and the image tracking in parallel with each other with respect to the flying vehicle system, executes a tracking control of the flying vehicle system by putting priority on a result of the optical tracking, and executes the tracking control of the flying vehicle system by the image tracking when the optical tracking becomes in an impossible condition, the optical tracking is returned based on a result of the image tracking, and a distance measurement result obtained in a process of the optical tracking is transmitted to the flying vehicle control device as a positional information, and wherein the flying vehicle control device makes the flying vehicle system fly based on the positional information.

Further, in the flying vehicle guiding system according to the present invention, the position measuring instrument performs a measurement of the flying vehicle system by the non-prism measurement under a condition where an image tracking control is executed, and the flying vehicle control device makes the flying vehicle system fly based on a positional information by the non-prism measurement.

Further, in the flying vehicle guiding system according to the present invention, the flying vehicle system further comprises an inertial measurement unit and measures a present position of the flying vehicle system with respect to a positional information transmitted from the position measuring instrument by the inertial measurement unit, and wherein the flying vehicle control device makes the flying vehicle system fly toward a last position obtained by a tracking based on a positional information obtained from the inertial measurement unit in a case where the optical tracking and the image tracking cannot be performed.

Furthermore, in the flying vehicle guiding system according to the present invention, the position measuring instrument has an operation unit, the flying vehicle system further comprises an inertial measurement unit, and wherein in a case where the optical tracking and the image tracking cannot be perform, a position capable of being tracked is designated by the operation unit, the flying vehicle control device makes the flying vehicle system fly toward a position designated based on the positional information obtained from the inertial measurement unit, and the measurement control unit makes the camera unit sight the designated position.

According to the present invention, the flying vehicle tracking method comprises an optical tracking in which a tracking light is projected to a retro-reflector of a flying vehicle with the retro-reflector, the tracking light is received, and a tracking of the flying vehicle is performed based on a light receiving result, and an image tracking in which an image of the flying vehicle is acquired, the flying vehicle is detected from the image, and the tracking of the flying vehicle is performed based on a detection result, wherein the optical tracking and the image tracking are executed in parallel with each other, and in a case where the flying vehicle cannot be tracked by the optical tracking, the optical tracking is returned based on the detection result of the image tracking. As a result, even in a case where the flying vehicle is lost in the optical tracking, it is possible to promptly return to the optical tracking without performing an optical searching.

Further, according to the present invention, the flying vehicle image acquiring method comprises a position measuring instrument and a ground base station, wherein the position measuring instrument has a camera unit with a zoom function, acquires an image of a flying vehicle, and is capable of performing a distance measurement and an angle measurement and of tracking the flying vehicle via an optical system of the camera unit, wherein the ground base station controls a flight of the flying vehicle based on a measurement result of the position measuring instrument, and wherein the ground base station controls the camera unit based on the measurement result of the position measuring instrument and controls a magnification of an acquired image of the flying vehicle. As a result, regardless of a distance to the flying vehicle, it is possible to acquire an image of the flying vehicle in an adequate size.

Further, according to the present invention, the flying vehicle displaying method comprises a position measuring instrument and a ground base station, wherein the position measuring instrument has a camera unit, acquires an image of a flying vehicle, and is capable of performing a distance measurement and an angle measurement and of tracking the flying vehicle via an optical system of the camera unit, wherein the ground base station controls a flight of the flying vehicle based on a measurement result of the position measuring instrument, and wherein the ground base station includes a display unit for displaying an image photographed by the camera unit and displays the flying vehicle on the display unit so that a size of the flying vehicle will be constant on an image based on the measurement result of the position measuring instrument. As a result, a flying condition of the flying vehicle and a soundness of the flying vehicle itself can be confirmed, and a relation between the flying vehicle and surroundings can be confirmed.

Furthermore, according to the present invention, the flying vehicle guiding system comprises a flying vehicle system capable of being remotely controlled, a position measuring instrument capable of performing a distance measurement and an angle measurement and of tracking the flying vehicle system, and a ground base station for controlling a flight of the flying vehicle system based on a measurement result of the position measuring instrument, wherein the flying vehicle system comprises a retro-reflector and a flying vehicle control device, wherein the position measuring instrument comprises a camera unit for sighting and photographing the flying vehicle system, a distance measuring unit for performing a prism measurement and a non-prism measurement via an optical system of the camera unit, angle detectors for detecting an angle in a sighting direction, and a measurement control unit, wherein the measurement control unit has a tracking control unit for performing an optical tracking by receiving a reflected light from the retro-reflector and for performing an image tracking by extracting the flying vehicle system from an image photographed by the camera unit, an image pickup control unit for controlling a photographing condition of the camera unit, a position measurement communication unit, and an image processing unit for detecting the flying vehicle system from the image acquired by the camera unit, wherein the ground base station has a control device and a base communication unit, wherein the measurement control unit executes the optical tracking and the image tracking in parallel with each other with respect to the flying vehicle system, executes a tracking control of the flying vehicle system by putting priority on a result of the optical tracking, and executes the tracking control of the flying vehicle system by the image tracking when the optical tracking becomes in an impossible condition, the optical tracking is returned based on a result of the image tracking, and a distance measurement result obtained in a process of the optical tracking is transmitted to the flying vehicle control device as a positional information, and wherein the flying vehicle control device makes the flying vehicle system fly based on the positional information. As a result, it is possible to guide the flying vehicle in a safe and reliable manner based only on the positional information of the position measuring instrument even under an environmental condition where a GPS device cannot be used.

DETAILED DESCRIPTION OF THE PREFERRED EMBODIMENT

A description will be given below on an embodiment of the present invention by referring to the attached drawings.

Figure 1:
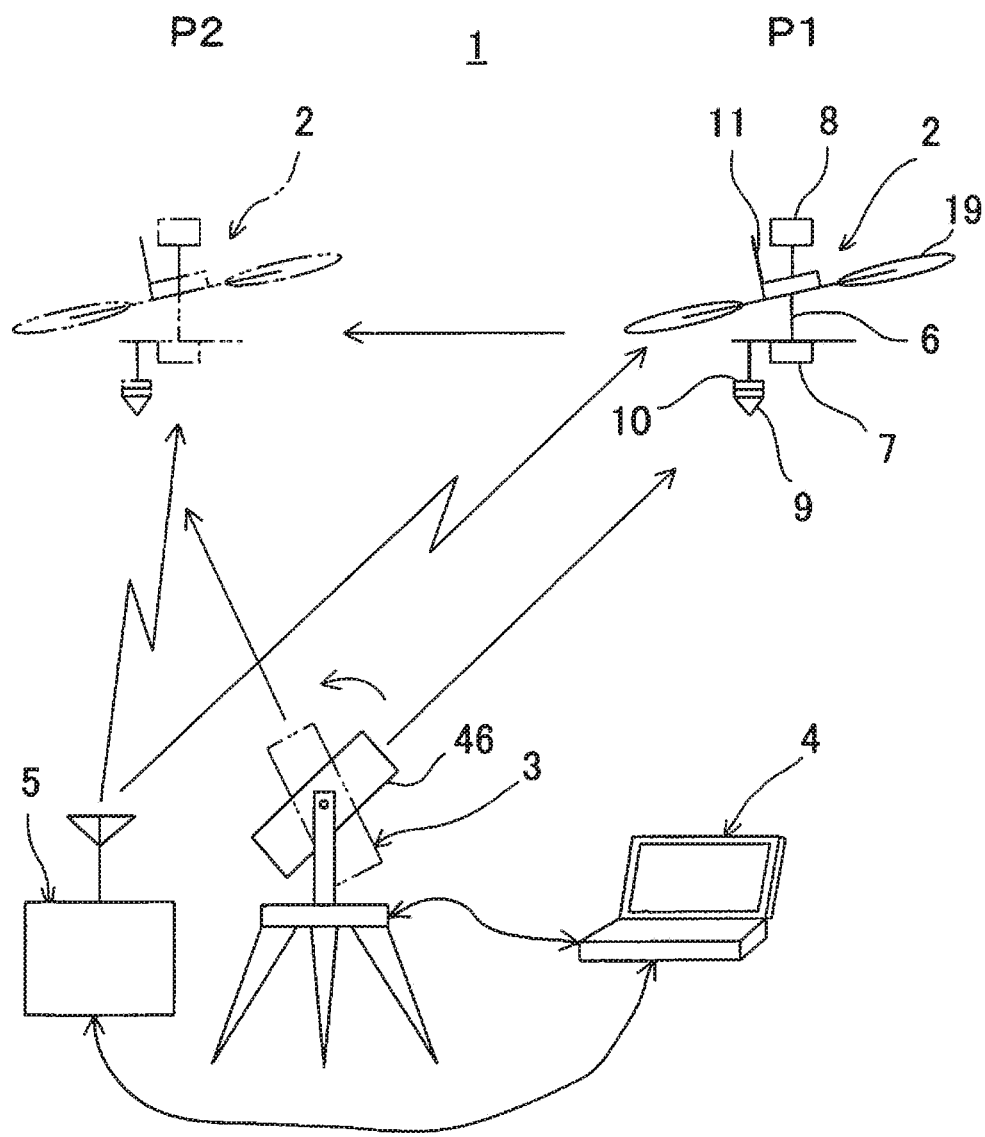
FIG. 1 is a block diagram to show a flying vehicle guiding system according to a present embodiment.

First, referring to FIG. 1, a description will be given on a flying vehicle guiding system according to the present embodiment.

A flying vehicle guiding system 1 primarily comprises a flying vehicle system (UAV) 2, a position measuring instrument 3, a ground base station 4, and a remote controller 5. FIG. 1 shows a case where a total station (TS) is used as the position measuring instrument 3.

The flying vehicle system 2 primarily comprises a flying vehicle 15 (to be described later), a shaft 6 as a supporting member vertically supported on the flying vehicle 15 via a gimbal mechanism, a camera 7 disposed at a lower end of the shaft 6, a GPS device 8 disposed at an upper end of the shaft 6, a prism 9 as a retro-reflector disposed at the lower end of the shaft 6, a directional angle sensor 10 integrally mounted with the prism 9 and disposed in a known relation with an optical axis of the camera 7, and a flying vehicle communication unit 11 for performing communication to and from the ground base station 4. The camera 7 fulfills a function as a measuring device for photographing aerial photographs, or for photographing an object to be measured for performing photogrammetry.

Here, for the flying vehicle system 2, a reference position is set, and a relationship between the reference position and the camera 7, the GPS device 8 and the prism 9 is already known. As the reference position of the flying vehicle system 2, for instance, a central position or the like of an image pickup element (not shown) of the camera 7 is used.

The camera 7 is rotatably supported via a horizontal shaft (to be described later), and the optical axis of the camera 7 is arranged so as to rotate within a plane which runs in parallel to an axis of the shaft 6. Further, a rotation range of the camera 7 includes at least a range where the optical axis of the camera 7 is from a vertical position to a horizontal position.

The shaft 6 is supported by the gimbal mechanism in such a manner that the axis of the shaft 6 runs vertically. Therefore, in a case where the optical axis of the camera 7 is vertical, the optical axis of the camera 7 and the axis of the shaft 6 coincide with each other.

An optical axis of the prism 9 is also arranged so as to run in parallel with the axis of the shaft 6 and is set so as to run in a vertical direction. Further, a positional relation between the prism 9 and the camera 7 is also already known. It is to be noted that it would suffice if the optical axes of each of the camera 7 and the prism 9 are supported so as to run in the vertical direction, and the axis of the shaft 6 may not necessarily run in the vertical direction.

The prism 9 is provided in such a manner that the prism 9 directed in a downward direction, and the prism 9 has optical characteristics to retro-reflect an entering light from entire ranges below the prism 9. Further, instead of the prism 9, a reflection seal may be provided at a predetermined position of the shaft 6.

A position which the GPS device 8 measures is located on the axis of the shaft 6, and the position which the GPS device 8 measures is already known with respect to the camera 7.

Figure 2A:
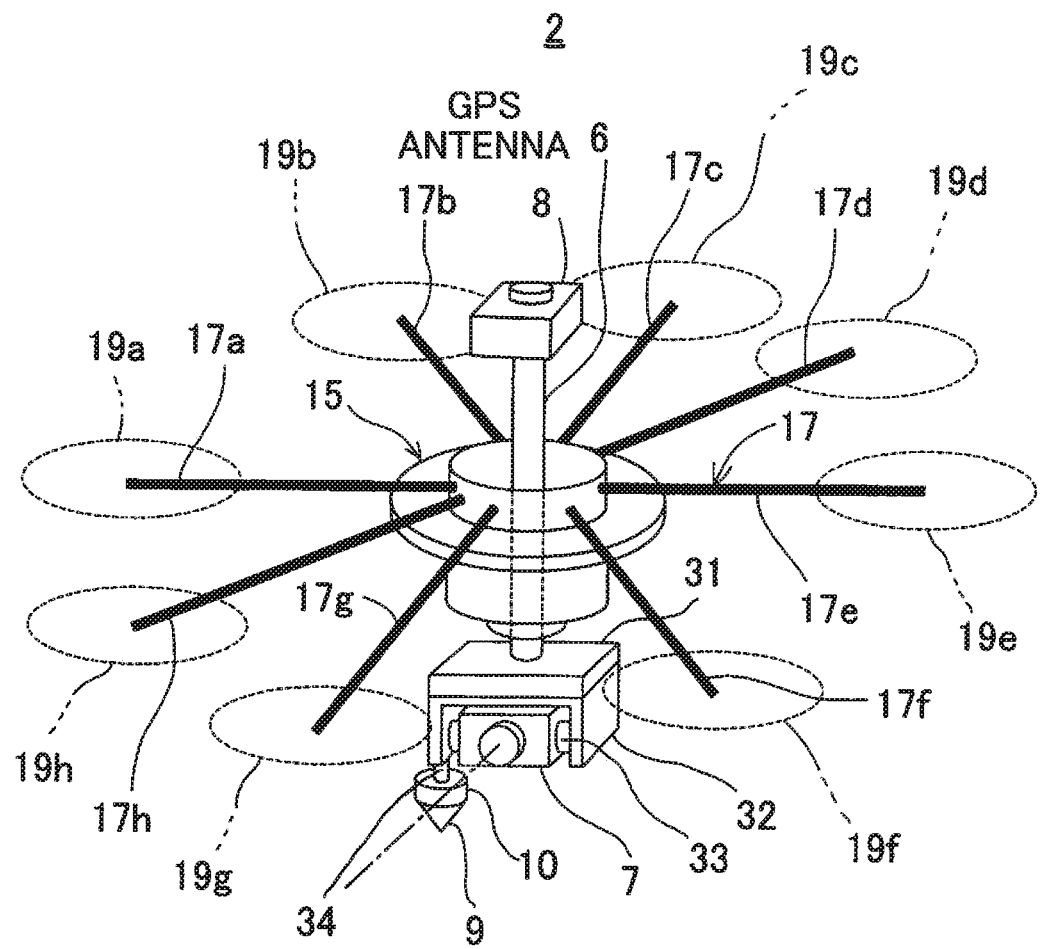
FIG. 2A is a perspective view to show a flying vehicle system according to the present embodiment.
Figure 2B:
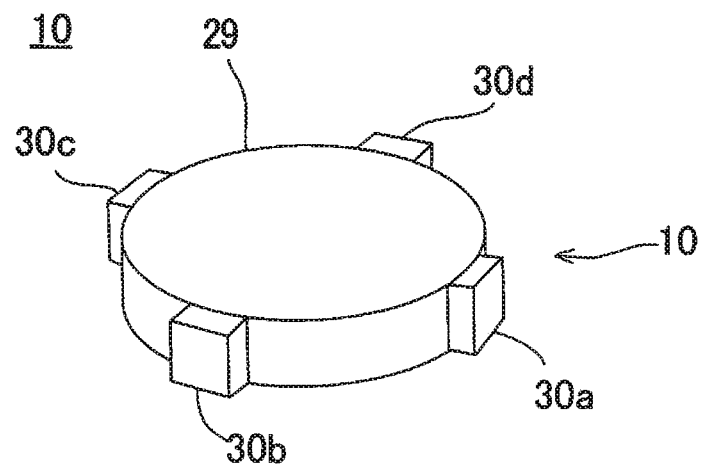
FIG. 2B is a perspective view to show one example of a directional angle sensor.

The directional angle sensor 10 detects a direction of the flying vehicle system 2. As the directional angle sensor 10, what is shown in FIG. 2B is provided, for instance.

A light receiving sensor 30 (in FIG. 2B, light receiving sensors 30a-30d) are provided at such positions as equally divided in a circumferential direction as required. Each of the light receiving sensors 30 is capable of receiving a distance measuring light or a tracking light issued from the position measuring instrument 3. By judging as to which of the light receiving sensors 30a-30d has detected the distance measuring light or the tracking light, the light receiving sensor 30 is adapted to detect a direction of the light receiving sensor 30 with respect to the distance measuring light or the tracking light (i.e. a direction of the flying vehicle system 2 with respect to the position measuring instrument 3).

The position measuring instrument 3 is installed at an arbitrary position, and a leveling is performed so that the position measuring instrument 3 is set in a horizontal position. The position measuring instrument 3 can perform a non-prism measurement (i.e. a measurement not using a prism and a retro-reflector) and a prism measurement (i.e. a measurement using a prism and a retro-reflector as an object to be measured), and also can perform measuring a horizontal angle and a vertical angle.

The non-prism measurement is capable of performing the non-prism measurement on a pre-scheduled range with reference to an installation position of the position measuring instrument 3.

Further, the position measuring instrument 3 has a tracking function. Under a condition where the prism measurement is performed, the position measuring instrument 3 measures three-dimensional coordinates (a slope distance, a horizontal angle and a vertical angle) of the prism 9, with respect to the installation position of the position measuring instrument 3 while tracking the prism 9 during a flight of the flying vehicle system 2. It is to be noted that in the present embodiment, a total station (TS) is used as the position measuring instrument 3, but it is not limited to the total station as long as a measuring instrument has the tracking function and is capable of measuring a slope distance, a horizontal angle and a vertical angle.

The position measuring instrument 3 is electrically connected to the ground base station 4 via wired or wireless means, and the measured three-dimensional coordinates of the prism 9 (i.e. the flying vehicle system 2) are inputted to the ground base station 4 as coordinate data.

The installation position (absolute coordinates) of the position measuring instrument 3 can be measured by a method as given below.

By the position measuring instrument 3, a position of the flying vehicle system 2 during the flight is measured. Further, by the GPS device 8, positional coordinates at two points of the flying vehicle system 2 are measured. Next, based on the results of measurement obtained by the position measuring instrument 3 and based on the positional coordinates (GPS coordinates) obtained by the GPS device 8, the installation position of the position measuring instrument 3 (GPS coordinates) is determined by a method of resection. Further, absolute coordinates can be obtained by a coordinate conversion of the GPS coordinates. Therefore, if the GPS coordinates are obtained, it becomes possible to obtain the absolute coordinates of the position measuring instrument 3. Further, it becomes possible to convert the results of the non-prism measurement with reference to the installation position of the position measuring instrument 3 to absolute coordinates.

Furthermore, the prism 9 (i.e. the flying vehicle system 2) is tracked by the position measuring instrument 3 and three-dimensional coordinates of the prism 9 as measured (i.e. the three-dimensional coordinates of the flying vehicle system 2) also can be converted to the GPS coordinates, and further to the absolute coordinates in a similar manner. Therefore, by transmitting the positional coordinates of the flying vehicle system 2 as measured by the position measuring instrument 3 in real time to the flying vehicle system 2 from the ground base station 4, it is possible to make the flying vehicle system 2 fly based on the positional coordinates measured by the position measuring instrument 3. It is to be noted that in the description as given below, the result in which the measurement result of the position measuring instrument 3 is converted to a GPS coordinate system is also referred as GPS coordinates.

It is to be noted that it may be so arranged that the position measuring instrument 3 is installed at a known point, and a process to measure the installation position of the position measuring instrument 3 by the method of resection may be omitted.

The ground base station 4 is a PC, for instance, and has an arithmetic device with a calculating function, a storage unit for storing data and programs, and further, a base communication unit. The base communication unit is capable of communicating to and from the position measuring instrument 3 and the remote controller 5, and the remote controller 5 is capable of performing wireless communication to and from the flying vehicle communication unit 11.

The flying vehicle system 2 has a control device as to be described later. Therefore, by setting flight plan data which include data such as a flying route and a photographing point of the flying vehicle 15, a photographing distance with respect to the object to be measured, an overlapping ratio between adjacent images or the like, it is possible to make the flying vehicle system 2 fly autonomously based on positional data from the position measuring instrument 3 or on positional data as determined by the GPS device 8.

The remote controller 5 is arranged in such a manner that the remote controller 5 can remotely control the flight of the flying vehicle system 2 in case of a manual operation. In a case where the manual operation is performed, the ground base station 4 sets a flight plan based on the results of the non-prism measurement and transmits flight control data relating to a flight range and a flying route to the remote controller 5 so that the flying vehicle system 2 can be remotely controlled according to the flight plan. When the flight control data relating to the flight range is transmitted from the ground base station 4, a flight control signal to be transmitted from the remote controller 5 is limited by the flight control data, and the flying vehicle system 2 is controlled in such a manner that the flying vehicle system 2 flies within the flight range. Further, the remote controller 5 is capable of remotely controlling the camera 7 and a shutter of the camera 7.

Figure 3:
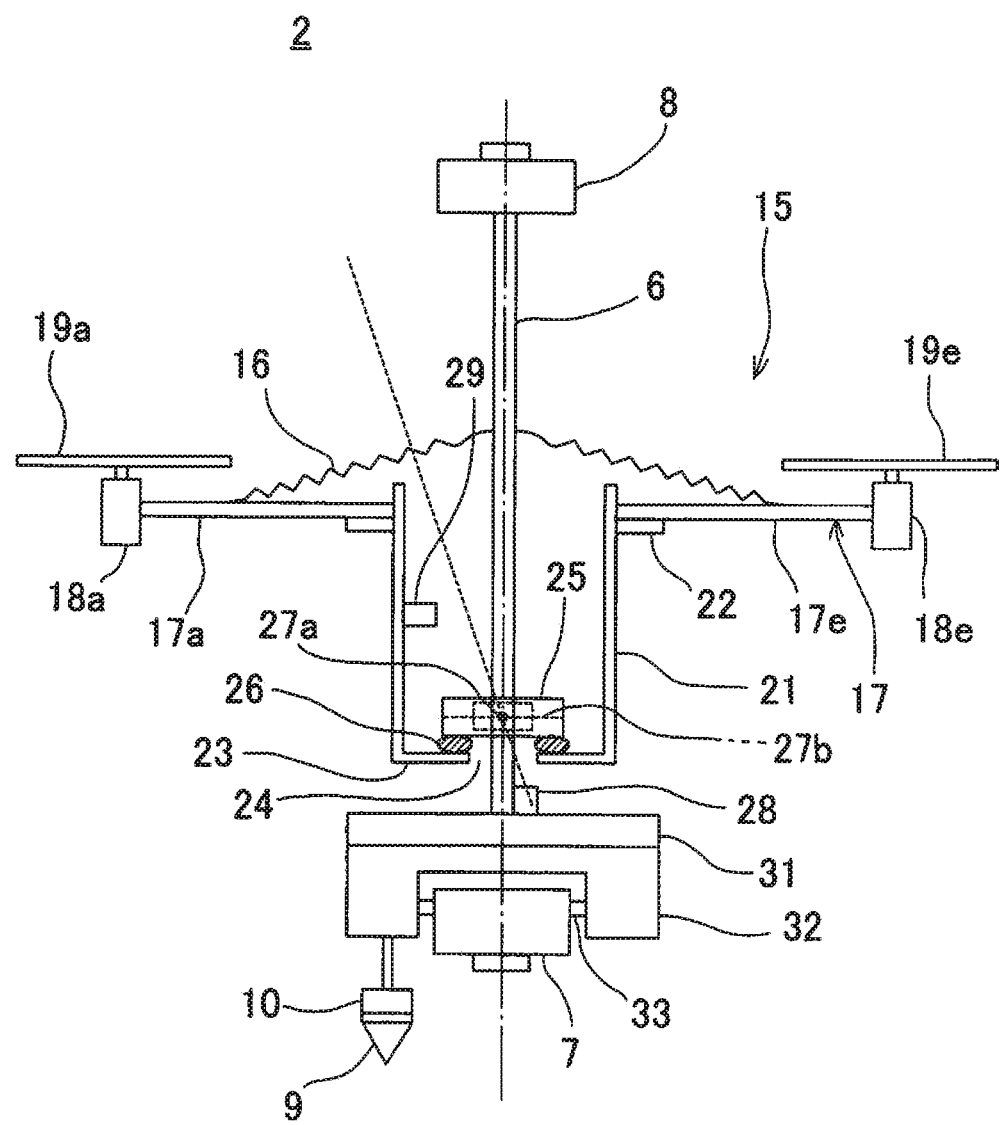
FIG. 3 is a cross-sectional view to show the flying vehicle system.

Next, by referring to FIG. 2A, FIG. 2B, and FIG. 3, a description will be given on the flying vehicle system 2.

The flying vehicle 15 has a plurality of and even-numbered propeller frames 17 extending in a radial direction, and a propeller unit is provided at a forward end of each of the propeller frames 17. The propeller unit comprises propeller motors 18 (propeller motors 18a and 18e as given in FIG. 3) mounted on the forward end of the propeller frame 17, and propellers 19 (in the figure, propellers 19a-19h) as mounted on an output shaft of the propeller motor 18. It is so arranged that the propellers 19 are rotated by the propeller motors 18 and the flying vehicle 15 flies.

The flying vehicle 15 has a main frame 21 in a hollow cylindrical shape at its center. An outer flange 22 extending in an outward direction is provided on an upper end of the main frame 21, and an inner flange 23 extending toward the center is provided on a lower end of the main frame 21. At a central portion of the inner flange 23, a hole 24 in a circular shape is formed.

Each of the propeller frames 17 is designed in a rod-like shape and is arranged within a plane, which perpendicularly crosses an axis of the main frame 21, and is provided by a predetermined number (at least 4, and, more preferably 8; in the FIG. 8 (propeller frames 17a-17h)) in a horizontal direction with an equal angular interval. An inner end of the propeller frame 17 passes through the main frame 21 and is fixed on the outer flange 22.

The shaft 6 is provided so as to pass through the main frame 21 in an up-and-down direction, and the shaft 6 is supported by a gimbal 25 so as to run in a vertical direction. The gimbal 25 is provided on the inner flange 23 via a vibration-proof member 26.

The gimbal 25 has swing shafts 27*a* and 27*b*, which perpendicularly cross each other in two directions, and the gimbal 25 movably supports the shaft 6 in perpendicular two directions. The vibration-proof member 26 absorbs a vibration when the propeller motor 18 and the propeller 19 are rotated, and the vibration-proof member 26 is so arranged that the vibration is not transmitted to the shaft 6.

A tilt sensor 28 is provided at a lower end of the shaft 6, and detects a tilting of the shaft 6 caused by a change of a flying condition of the flying vehicle 15. Further, the tilt sensor 28 detects an angle between a vertical line and the axis of the shaft 6 in a case where the shaft 6 is tilted with respect to the vertical line. A detection result of the tilt sensor 28 is transmitted to a flying vehicle control device 35 (see FIG. 4) which is to be described later.

The directional angle sensor 10 detects a direction of the flying vehicle 15. The direction of the flying vehicle 15 is, for instance, a direction of the flying vehicle 15 with reference to a position where the position measuring instrument 3 is installed. It is to be noted that, in the present embodiment, a directional angle sensor as shown in FIG. 2B is used as the directional angle sensor 10. Further, an azimuth sensor may be used as the directional angle sensor 10.

The present embodiment shows a case where the directional angle sensor 10 is provided integrally with the prism 9. On a lower surface of a camera holder 32 (to be described later), the directional angle sensor 10 is provided via a supporting member 34. Further, on a lower surface of the directional angle sensor 10, the prism 9 is provided. By referring to FIG. 2B, a brief description will be given below on the directional angle sensor 10.

Along an outer peripheral surface of a sensor case 29 formed in a cylindrical shape, light receiving sensors 30*a*, 30*b*, 30*c* and 30*d* are arranged. The light receiving sensors 30*a*, 30*b*, 30*c* and 30*d* are disposed at positions divided to four equal parts by dividing a circumferential periphery, and each of the light receiving sensors 30*a*, 30*b*, 30*c* and 30*d* is arranged in such a manner that a light receiving signal is issued when receiving the distance measuring light or the tracking light emitted from the position measuring instrument 3. Further, by judging as to which position of the light receiving sensors 30*a*, 30*b*, 30*c* and 30*d* receives the distance measuring light or the tracking light, the direction of the flying vehicle system 2 with respect to the position measuring instrument 3 is detected.

A control box 31 is provided on the lower end of the shaft 6. Inside the control box 31, the flying vehicle control device 35 and an IMU (Inertial Measurement Unit) 40 (to be described later) are accommodated. On a lower surface of the control box 31, the camera holder 32 is provided, and the camera 7 is provided on the camera holder 32 via a horizontal shaft 33. The camera 7 is rotatable with the horizontal shaft 33 as the center, and an image pickup direction changing motor 12 (see FIG. 4) for rotating the camera 7 via the horizontal shaft 33 is provided on the camera holder 32. The image pickup direction changing motor 12 rotates the camera 7 at an angle as required with respect to the vertical direction according to a command from the flying vehicle control device 35. Further, a rotation angle of the camera 7 is detected by a camera angle detector 13 (see FIG. 4), and the detection result is inputted to the flying vehicle control device 35.

The IMU 40 detects a moving direction and a moving distance from a predetermined position (a point which has been already known) and detects a position after moving in real time.

It is to be noted that a standard posture of the camera 7 is such that an optical axis runs in a vertical direction. In FIG. 2A, the optical axis of the camera 7 is set to run in a horizontal direction and, in FIG. 3, the optical axis of the camera 7 is set to run in a vertical direction in order to facilitate the explanation.

A digital camera is used as the camera 7, and a still image (static image) can be photographed, and a video image can also be taken. Further, a CCD, a CMOS sensor, etc., each of which is an aggregate of pixels, is used as an image pickup element, and a position of each pixel can be specified in the image pickup element. For instance, the position of each pixel can be specified by orthogonal coordinates, which have a point on the image pickup element as an origin point where an optical axis of a camera passes through.

On the upper end of the shaft 6, the GPS device 8 is provided. The center of the GPS device 8 (a reference position of the GPS device 8) coincides with the axis of the shaft 6, and the optical axis of the prism 9 runs in parallel to the axis of the shaft 6.

The control box 31, the camera holder 32, the camera 7 and the prism 9, etc. fulfill a function as a balance weight. Under a condition where no external force is applied on the shaft 6, i.e. under a free condition, a weight balance of the control box 31, the camera holder 32, the camera 7 and the prism 9, etc. is set so that the shaft 6 is maintained in a vertical condition.

For the purpose of maintaining a posture of the shaft 6 in a stable manner and in the vertical condition, in a case where the shaft 6 is tilted rapidly (in a case where a posture of the flying vehicle 15 is changed rapidly), a balance auxiliary member may be provided in order that the vertical condition can be restored quickly. It is to be noted that in a case where the shaft 6 can be sufficiently maintained in the vertical condition by a balance weight function of the control box 31, the camera holder 32, the camera 7 and the prism 9, etc., it is not necessary to provide the balance auxiliary member.

In examples as given below, a description will be given on a case where a damper spring 16 is provided as the balance auxiliary member.

Between the propeller frame 17 and the shaft 6, the damper spring 16 is provided. At least three, or more preferably four damper springs 16 are provided. It is preferable that the damper springs 16 are provided between the propeller frames 17 extending in parallel to the swing shafts 27*a* and 27*b*, and the shaft 6.

Further, the four damper springs 16 apply tensile forces between the shaft 6 and the propeller frames 17 respectively and in a condition where the flying vehicle 15 is in a horizontal posture (in a condition where the propeller frame 17 is in a horizontal position), the four damper springs 16 are set so that the shaft 6 is maintained by the balancing of the tensile force. Further, the tensile force and a spring constant of the damper spring 16 are set to smaller values, and the shaft 6 is directed in the vertical direction due to an action of a gravity when the flying vehicle 15 is tilted.

The damper spring 16 is a biasing means for biasing the shaft 6 in the vertical condition, and in a case where the shaft 6 is swung or vibrated, the damper spring 16 promptly returns the shaft 6 to the vertical condition and makes a vibration attenuate. Further, as the biasing means, in addition to the damper spring 16, a torsion coil spring may be used to rotate in a returning direction when the swing shafts 27a and 27b of the gimbal 25 are rotated.

Figure 4:
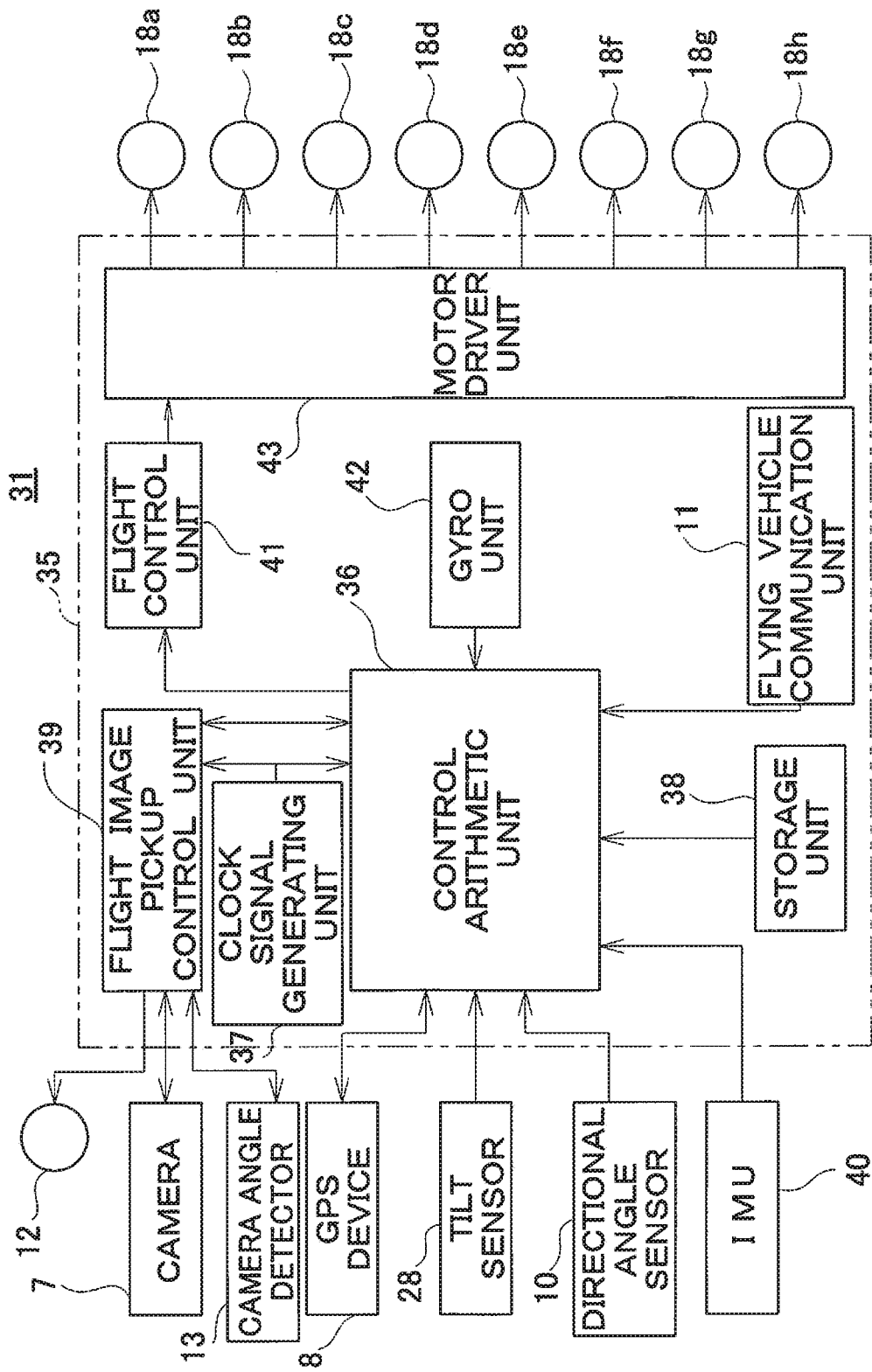
FIG. 4 is a block diagram to show a control system of the flying vehicle system.

By referring to FIG. 4, a description will be given below on a control system of the flying vehicle system 2.

The flying vehicle control device 35 and the IMU 40 are accommodated inside the control box 31.

The flying vehicle control device 35 primarily comprises a control arithmetic unit 36, a clock signal generating unit 37, a storage unit 38, a flight image pickup control unit 39, a flight control unit 41, a gyro unit 42, a motor driver unit 43, and the flying vehicle communication unit 11.

A photographing by the camera 7 is controlled by the flight image pickup control unit 39, and the image taken by the camera 7 is inputted to the flight image pickup control unit 39 as image data.

In the storage unit 38, a program storage area and a data storage area are formed. Various types of programs are stored in the program storage area. These programs include: a photographing program for controlling a photographing of the camera 7, a flight control program for controlling a driving of the propeller motor 18 and for controlling a flight based on a flight control signal to be described later, a flying vehicle system position calculating program for calculating the position of the flying vehicle system 2 in real time based on a detection result by the IMU 40, a restoration program for restoring the flying vehicle 15 to a predetermined position based on a calculated position, a communication program for transmitting data as acquired to the ground base station 4 and for receiving a flight command or the like from the remote controller 5, a data processing program for processing and storing data acquired by the camera 7, an image tracking program for tracking by using video image data acquired by the camera 7, a flight plan preparing program for preparing a flight plan, and other programs.

In the data storage area, various types of data are stored. These data include: flight plan data for executing an autonomous flight, still image data and video image data acquired by the camera 7, positional data of the flying vehicle system 2 determined by the GPS device 8 during the flight, positional data of the flying vehicle system 2 as measured by the position measuring instrument 3 and as transmitted from the remote controller 5, moving distance data as measured by the IMU 40, positional data of the flying vehicle system 2, and further, time and positional data when the still image data and the video image data are acquired, and other data.

The flight image pickup control unit 39 controls regarding an image pickup of the camera 7 based on the control signal issued from the control arithmetic unit 36. The modes of the control are: a selecting of a camera angle suitable for the object to be measured, a driving control of the image pickup direction changing motor 12 based on a detection result of the camera angle detector 13, a controlling of the image pickup of the camera 7, and a controlling to acquire a still image at a predetermined time interval during acquiring a video image, etc. Further, with respect to the camera 7, an image pickup moment is controlled or synchronously controlled based on a clock signal issued from the clock signal generating unit 37.

The directional angle sensor 10 detects a direction of the flying vehicle 15, and inputs a detection result to the control arithmetic unit 36. The gyro unit 42 detects a posture of the flying vehicle 15 under the flight condition, and inputs a detection result to the control arithmetic unit 36.

The flying vehicle communication unit 11 receives a flight control signal from the remote controller 5 when the flight of the flying vehicle 15 is remotely controlled by the remote controller 5, and inputs the flight control signal to the control arithmetic unit 36. Or, the flying vehicle communication unit 11 has such a function that image data photographed by the camera 7 are transmitted to the ground base station 4 on the ground side together with a time when the image was taken.

The control arithmetic unit 36 converts the positional coordinates as measured by the position measuring instrument 3 to GPS coordinates and obtains as GPS coordinates of the flying vehicle system 2. Further, the control arithmetic unit 36 obtains the GPS coordinates of the flying vehicle system 2 as determined by the GPS device 8. The control arithmetic unit 36 calculates the flight control signal based on the GPS coordinates thus obtained and on the flight command as transmitted from the remote controller 5, or calculates the flight control signal based on the flight plan data stored in the storage unit 38 and on the GPS coordinates and outputs the flight control signal to the flight control unit 41.

As to using which of the GPS coordinates obtained based on the measurement results of the position measuring instrument 3 or the GPS coordinates determined by the GPS device 8, the GPS coordinates which could be obtained are used as a general rule. For instance, in a case where an obstacle exists between the flying vehicle system 2 and the position measuring instrument 3, and the tracking of the flying vehicle system 2 cannot be performed by the position measuring instrument 3, there is no more positional data from the position measuring instrument 3. As a result, the GPS coordinates as determined by the GPS device 8 are used. Further, the positional data as measured by the IMU 40 is updated in real time or at the time interval as predetermined based on the positional data acquired by the GPS device 8 or by the position measuring instrument 3.

Further, under an environmental condition such as a case where radio waves from an artificial satellite are interrupted due to a building or the like, the GPS coordinates obtained based on the measurement result of the position measuring instrument 3 are used. It is to be noted that the absolute coordinates obtained from the GPS coordinates may be used as a positional information to make the flying vehicle system 2 fly.

Further, there may be a case where the flying vehicle system 2 is located at a position such as under a bridge where radio waves from the artificial satellites are interrupted and an obstacle exists between the flying vehicle system 2 and the position measuring instrument 3, i.e. a case where the GPS coordinates cannot be obtained by neither the position measuring instrument 3 nor the GPS device 8. In such case, the IMU 40 measures a moving distance and a moving direction (i.e. a present position of the flying vehicle system 2) from a position where an obtaining of the GPS coordinates has been interrupted, for instance, from the position where the position measuring instrument 3 cannot track the flying vehicle system 2. Based on the measurement result, the control arithmetic unit 36 outputs the flight control signal for restoring the flying vehicle system 2 to a position where the GPS coordinates can be obtained or to a tracking condition by the position measuring instrument 3. Here, a positional information of the flying vehicle system 2 until restoring is obtained by the IMU 40.

It is to be noted that in a case where both of the measurement results, i.e. the measurement result by the position measuring instrument 3 and the measurement result by the GPS device 8 can be obtained, the order of priority for using the results may be determined in advance. Since the position measuring instrument 3 has a better measurement accuracy, in a case where the priority is given to the accuracy, it is preferable to put the priority on the measurement results by the position measuring instrument 3.

Further, the control arithmetic unit 36 executes the control necessary for acquiring an image according to the program as required, which is stored in the storage unit 38.

When the flight control signal is inputted from the control arithmetic unit 36, the flight control unit 41 drives the propeller motors 18a-18h to a condition as required via the motor driver unit 43 based on the flight control signal.

Figure 5:
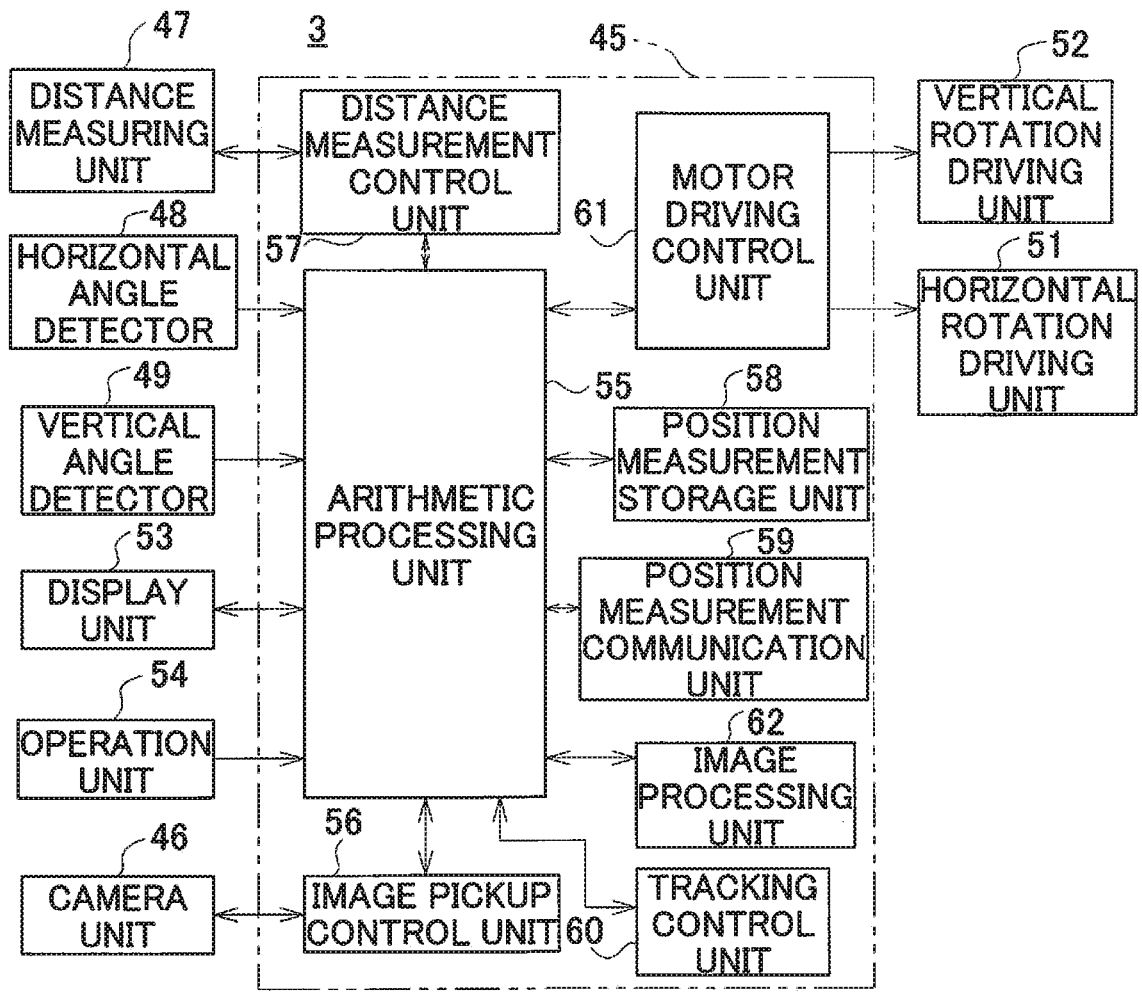
FIG. 5 is a schematical block diagram to show one example of a position measuring instrument according to the present embodiment.

Next, by referring to FIG. 5, a description will be given on the position measuring instrument 3.

The position measuring instrument 3 primarily comprises a measurement control unit 45, a camera unit 46 (see FIG. 1), a distance measuring unit 47, a horizontal angle detector 48, a vertical angle detector 49, a horizontal rotation driving unit 51, a vertical rotation driving unit 52, a display unit 53, an operation unit 54, etc.

As the camera unit 46, a digital camera is used, and still images can be taken and video images can also be taken. Further, a CCD, a CMOS sensor, etc., each of which is an aggregate of pixels, is used as an image pickup element, and a position of each pixel can be specified in the image pickup element. Further, the camera unit 46 is a camera, which is capable of zooming in optically or by a digital processing, or by both a zoom of an optical zoom and a zoom of a digital processing (a digital zoom). Further, an optical system of the camera unit 46 also fulfills a function as a telescope for sighting the object to be measured.

It is to be noted that it may be arranged in such a manner that an image pickup function is added to the telescope having a zoom function and the telescope fulfills a function as the camera unit.

The distance measuring unit 47 emits a distance measuring light via the optical system of the camera unit 46, and further, receives the reflected light from the object to be measured via the optical system of the camera unit 46, and measures a distance. Further, the distance measuring unit 47 has three modes as a measurement mode, i.e. a non-prism measurement mode, a prism measurement mode, and further a tracking measurement mode for measuring the object to be measured while tracking the object to be measured, and it is possible to measure the distance to the object to be measured by one of these three modes. It is to be noted that the tracking measurement mode includes an optical tracking mode and an image tracking mode.

In the optical tracking measurement mode, the tracking light is emitted via the optical system of the camera unit 46, and the reflected light from the object to be measured (the prism) is received by the image pickup element, and a tracking is performed so that a light receiving position exists within a predetermined range on the image pickup element.

Further, in the image tracking mode, the object to be measured (the flying vehicle 15) is detected from an image acquired by the camera unit 46 by means of the image processing, and the tracking is performed so that the detected image exists within the predetermined range on the image pickup element.

Here, regarding a detection of the flying vehicle 15, various types of detection methods can be adopted. These detection methods include: a detection method with a basic pattern of the flying vehicle 15 and to detect by a pattern matching from the image acquired by the camera unit 46 based on the basic pattern, or a detection method to obtain an amount of features (a histogram) such as a shape, a color, or the like regarding the flying vehicle 15 in advance, to learn various types of the amount of features and to specify the flying vehicle 15 by comparing learned data, and other detection methods. Further, it is possible to use two or more detection methods at the same time. Based on an approximate position of the flying vehicle 15 as detected in the image tracking mode, the object to be measured (the prism) is specified by a local prism scanning function by the position measuring instrument 3.

It is to be noted that in an optical tracking and an image tracking, since the tracking is performed by using the same optical system and the same light receiving element, a tracking result has a complete interchangeability, and a stability of the tracking is not detracted even in a case where the tracking is switched from the optical tracking to the image tracking, or from the image tracking to the optical tracking.

Further, a tracking range of the image tracking is wider than the tracking range of the optical tracking, and the tracking range can be changed by changing a magnification of the optical zoom. Further, in order to extract the flying vehicle 15 by means of the image processing, a size of the flying vehicle 15 is important, and the magnification of the optical zoom is set so that the flying vehicle 15 becomes in a size capable of detecting or larger (for instance, about 40 pixels×40 pixels).

The horizontal angle detector 48 detects a horizontal angle in a sighting direction of the camera unit 46. Further, the vertical angle detector 49 detects a vertical angle in the sighting direction of the camera unit 46. The detection results of the horizontal angle detector 48 and the vertical angle detector 49 are inputted to the measurement control unit 45.

The display unit 53 is a touch panel, for instance, and it is possible to adjust a sighting position by sliding a finger in touched condition. Further, the operation unit 54 is adapted to perform various types of operations such as a change of the measurement mode, a setting of a measuring condition, a fine adjustment of a sighting position, etc. Further, the display unit 53 can also fulfill a function of the operation unit 54.

The measurement control unit 45 primarily comprises an arithmetic processing unit 55, an image pickup control unit 56, a distance measuring control unit 57, a position measurement storage unit 58, a position measurement communication unit 59, a tracking control unit 60, a motor driving control unit 61, an image processing unit 62, and the like.

The image pickup control unit 56 sets a magnification of the camera unit 46 and a timing of photographing, etc., according to a command from the arithmetic processing unit 55. Further, the image pickup control unit 56 controls an image pickup of the camera unit 46 according to the magnification and the timing of photographing, and the like as set.

Further, the image pickup control unit 56 performs a zoom control of the camera unit 46. For instance, under a condition where the optical tracking is being executed, the optical zoom is controlled based on a distance measurement value by the distance measuring unit 47 so that the size of the flying vehicle 15 in a picked-up image becomes in a size capable of an image recognition, for instance about 40 pixels×40 pixels. Here, a size of an image is not limited to 40 pixels×40 pixels, and it would suffice if the image is in an image size capable of the image processing such as the pattern matching, or the like.

Further, in a case where the flying vehicle system 2 is monitored under a condition where the optical tracking is being executed, the image obtained by the optical zoom may be displayed. Alternatively, in a case where a flight posture of only the flying vehicle system 2 or the like is observed, the flying vehicle system 2 is enlarged by the digital zoom and is displayed on the display unit 53. Further, in a case where the flying vehicle system 2 is wanted to observe together with a surrounding condition while flying, the flying vehicle system 2 is displayed by reducing a magnification of the digital zoom.

The distance measurement control unit 57 decides that the measurement should be executed in which of the modes, the non-prism measurement mode, the prism measurement mode or the tracking light measurement mode based on a measurement selecting command from the arithmetic processing unit 55. Further, the distance measurement control unit 57 controls a measurement by the distance measuring unit 47 according to the measurement mode as determined. Here, in the non-prism measurement mode, the position measuring instrument 3 performs measuring regarding structures such as a bridge, a dam, etc. as the object to be measured. In the tracking measurement mode, the object to be measured acts as the prism 9, and the position of the flying vehicle system 2 is measured while tracking the flying vehicle system 2.

In the position measurement storage unit 58, various types of programs are stored. These programs include: a measurement program for performing a distance measurement by each of the measurement modes such as the non-prism measurement mode, the prism measurement mode, and the tracking measurement mode, an optical tracking program for carrying out the tracking by receiving the tracking light, an image tracking program for performing a tracking by an image processing, a zoom control program, a communication program for performing communication to and from the flying vehicle system 2 and the ground base station 4, and other programs. Further, in the position measurement storage unit 58, measurement results of the object to be measured (a distance measurement and an angle measurement), and the images acquired by the camera unit 46 are stored.

The position measurement communication unit 59 transmits the measurement results (a slope distance, a vertical angle and a horizontal angle of the prism 9) of the object to be measured (the prism 9) in the tracking measurement mode to the ground base station 4 in real time. The prism tracking (the optical tracking) and the image tracking for detecting the object to be measured from the picked-up image and for tracking, are performed at the same time, and the prism tracking is carried out with priority.

In the optical tracking, the tracking control unit 60 calculates a difference between a center of the image pickup element and a light receiving position with respect to the prism 9, based on the light receiving position on the image pickup element when the tracking light as reflected by the prism 9 is received. Further, the tracking control unit 60 transmits a control signal to the motor driving control unit 61 based on the calculation results via the arithmetic processing unit 55 so that a deviation between the center of the image pickup element and the light receiving position with respect to the prism 9 will be zero.

Further, in the image tracking, the tracking control unit 60 detects the object to be measured from the image acquired by the camera unit 46, calculates a deviation between a position of the object to be measured as detected and the center of the image pickup element, and transmits the control signal to the motor driving control unit 61 via the arithmetic processing unit 55 so that the deviation will be zero.

In order to make the camera unit 46 sight the object to be measured, the motor driving control unit 61 controls the horizontal rotation driving unit 51 and the vertical rotation driving unit 52, and rotates the camera unit 46 in a vertical direction or in a horizontal direction. Or, in order to make the camera unit 46 track the object to be measured based on the control signal from the tracking control unit 60, the motor driving control unit 61 controls the horizontal rotation driving unit 51 and the vertical rotation driving unit 52, and rotates the camera unit 46 in the vertical direction or in the horizontal direction.

Further, the image processing unit 62 performs an image processing as necessary such as extracting feature points and edges from the image acquired by the camera unit 46, or obtaining the histogram. By the image processing, the flying vehicle is detected from the image. The arithmetic processing unit 55 detects the object to be measured by a prism scanning (a prism searching) and calculates a directional angle of the object to be measured, based on the position of the flying vehicle in the image pickup element and based on detection results of the horizontal angle detector 48 and the vertical angle detector 49. In a case where the image tracking is carried out, the directional angle thus calculated is used.

Figure 6:
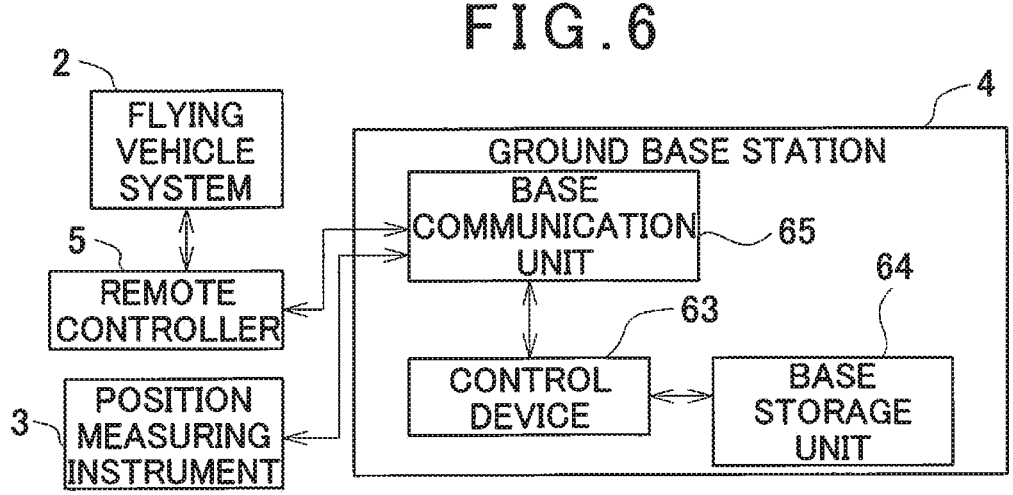
FIG. 6 is a drawing to show an approximate arrangement of a ground base station according to the present embodiment, and to show a relation between the flying vehicle system, the position measuring instrument, the ground base station, and a remote controller.
Figure 7:
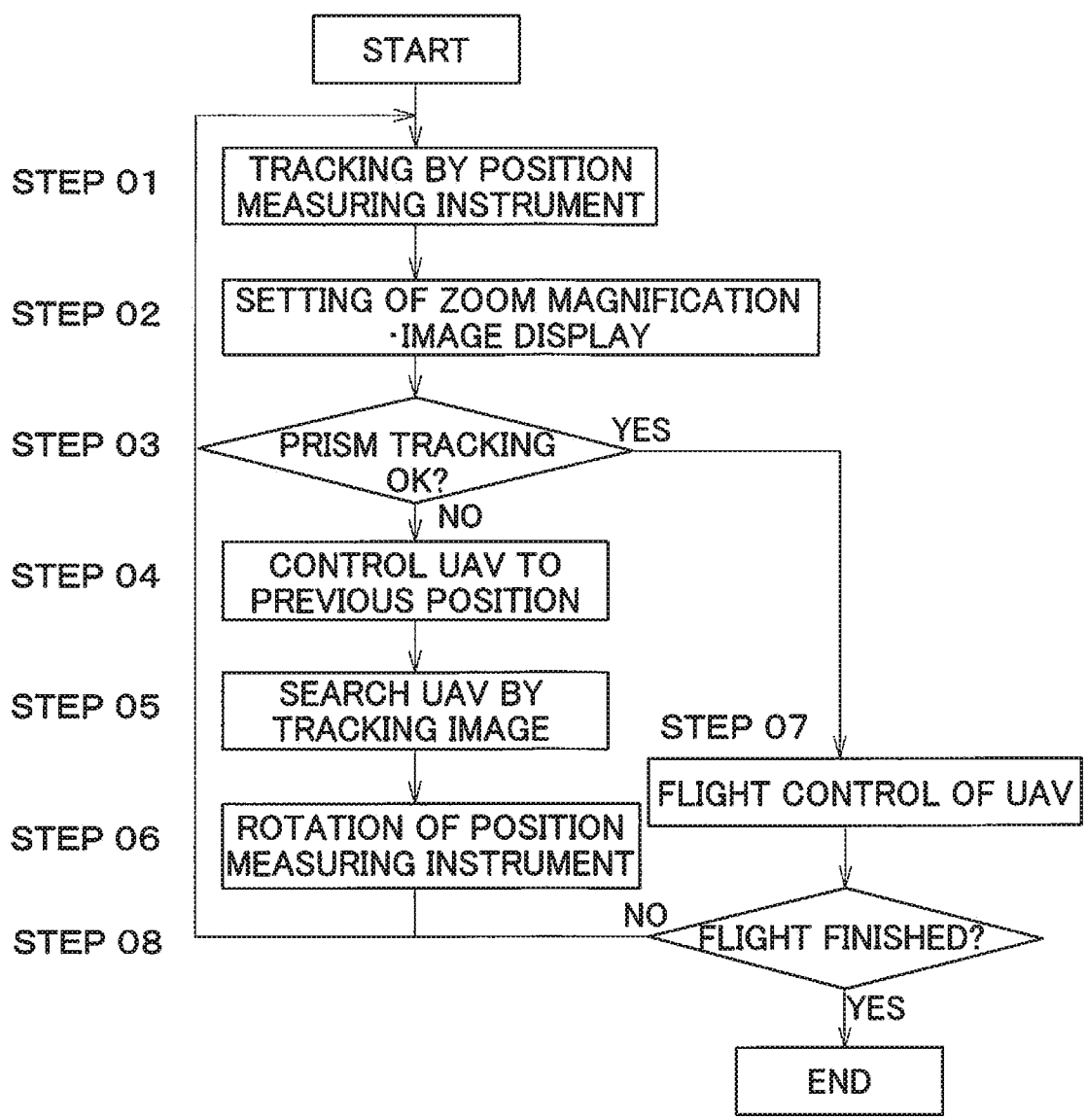
FIG. 7 is a flowchart to explain a guidance of a flying vehicle in the present embodiment.

FIG. 6 is a drawing to show an approximate arrangement of the ground base station 4, and the relation between the flying vehicle system 2, the position measuring instrument 3, the ground base station 4, and the remote controller 5.

The ground base station 4 comprises a control device 63 having a calculating function, a base storage unit 64, and further, a base communication unit 65.

The control device 63 has a clock signal generating unit (not shown). The control device 63 associates image data, shutter time data and coordinates data as received via the remote controller 5 with a clock signal respectively. Further, the control device 63 processes these data as time series data based on the clock signal and stores in the base storage unit 64. Further, the control device 63 prepares an approximate flight plan (to be described later) and prepares a detailed flight plan data (to be described later) based on the approximate flight plan.

In the base storage unit 64, various types of programs are stored. These programs include: an approximate flight plan preparing program for setting up a flight range and a flight route and the like based on a map information obtained via the Internet or on the images acquired by the camera unit 46, and for preparing the approximate flight plan, a detailed flight plan preparing program for amending the approximate flight plan based on measurement results of the flight range as obtained by the position measuring instrument 3, and for preparing the detailed flight plan, a flight control program for preparing flight control data for controlling the flight of the flying vehicle system 2 according to the detailed flight plan, a communication program for performing data communication to and from remote controller 5 and the position measuring instrument 3, a program for calculating the GPS coordinates of the installation position of the position measuring instrument 3 based on the GPS coordinates of the flying vehicle system 2 at two positions or more as transmitted from the flying vehicle system 2, a program for converting the measurement results of the position measuring instrument 3 (the slope distance, the vertical angle, and the horizontal angle of the prism 9) to the GPS coordinates based on the GPS coordinates of the installation position of the position measuring instrument 3, and other programs.

It is to be noted that regarding the operation to convert the measurement results of the position measuring instrument 3 to the GPS coordinates based on the GPS coordinates of the installation position of the position measuring instrument 3, it may be so arranged that the measurement results of the position measuring instrument 3 are transmitted to the flying vehicle system 2 without converting, and the operation may be carried out by the flying vehicle control device 35 of the flying vehicle system 2.

Further, various data such as images acquired by the flying vehicle system 2, measurement data as measured by the position measuring instrument 3 (coordinate data), a time when the images are acquired, positional coordinates, the detailed flight plan data, and the like are stored in the base storage unit 64.

The base communication unit 65 performs wired communication or wireless communication to and from the ground base station 4 and the remote controller 5.

The detailed flight plan data is transmitted to the flying vehicle system 2 via the remote controller 5 or the base communication unit 65, and the detailed flight plan data is stored in the storage unit 38. The flight control unit 41 makes the flying vehicle system 2 fly autonomously based on the detailed flight plan data. Or, the detailed flight plan data is stored in the base storage unit 64 of the ground base station 4, and by transmitting a flight control signal as prepared to the flying vehicle system 2 based on the detailed flight plan data, it may be so arranged that the flying vehicle system 2 executes an autonomous flight.

Here, in the approximate flight plan, a measurement range is set according to an existing map information, a photograph, a design drawing, etc., and a flight route is set on a map. Further, in the setting of the flight route, for instance, in a case where an aerial photograph is photographed, the overlapping ratio, photographing points, and the like are taken into consideration. As described above, a flight plan (the approximate flight plan) including a flying condition, a photographing condition, etc. is prepared. The approximate flight plan is based on a two-dimensional information such as a map and the like, and is two-dimensional flight plan data.

Next, the detailed flight plan is prepared according to the approximate flight plan. For instance, in the present embodiment, the position measuring instrument 3 capable of performing the non-prism measurement is comprised, and when a scanning measurement is performed on the flight route by the position measuring instrument 3 in the non-prism measurement mode, three-dimensional data on the flight route of the object to be measured (a surface) can be acquired. Therefore, by setting a distance between the object to be measured and the flight route, three-dimensional flight plan data (the detailed flight plan data) can be prepared.

Further, in a case where there is an area where distance measurement data cannot be obtained in a process to measure the flight route in the non-prism measurement mode, this area where data is not acquired is excluded from the flight plan.

Based on the three-dimensional flight plane data, by taking the area where the data is not acquired into consideration, it is possible to realize an autonomous flight and a flight guidance of the flying vehicle system 2 in safety and with high accuracy.

A description will be given below on a tracking and a flight guidance of the flying vehicle in the present embodiment by referring to a flowchart of FIG. 7 and FIG. 8A, FIG. 8B and FIG. 8C.

It is to be noted that a description will be given below on a flight guidance under an environmental condition where a positional information cannot be obtained by the GPS device 8.

(Step 01) Under a condition where the flying vehicle system 2 is positioned on the ground, the prism 9 is sighted by the position measuring instrument 3 (the optical system of the camera unit 46) (a condition where the prism 9 is sighted is referred as "prism lock"). When a sighting is completed, the flying vehicle system 2 is flown, and the optical tracking is executed. By performing the optical tracking, a present position of the flying vehicle system 2 is measured in real time. The flying vehicle system 2 performs the autonomous flight based on the detailed flight plan data and on the present position.

(Step 02) The image tracking is performed at the same time as the optical tracking, and the image of the flying vehicle system 2 is always acquired by the camera unit 46. By being performed a tracking measurement in Step 01, a distance to the prism 9 (i.e. the flying vehicle system 2) is being measured. Based on this distance, the magnification of the optical zoom is calculated so that a size of the flying vehicle system 2 as obtained in the image will be always constant, and a zoom of the camera unit 46 is controlled so to be a calculated zoom magnification.

It is to be noted that it is preferable that the magnification of the optical zoom is set in such a manner that the flying vehicle system 2 and the surroundings are included in a range as required. Regarding a range to acquire an image including the flying vehicle system 2, the operator can adequately set from the ground base station 4. Further, the operator can also adequately set from the ground base 4 regarding the size of the flying vehicle system 2 in the image.

The image acquired by the camera unit 46 is displayed on a display unit (not shown) of the ground base station 4. As the image displayed on the display unit, the image acquired by the camera unit 46 or an image as acquired by the digital zoom of this image is displayed.

By being displayed the image acquired by the camera unit 46, it is possible to grasp an environmental condition and a condition where the flying vehicle system 2 is flying. Further, by displaying only the flying vehicle system 2 by the digital zoom, it is possible to observe the flying vehicle system 2 itself and the flying posture of the flying vehicle system 2 and the like.

A changing of the magnification of the digital zoom is performed at the ground base station 4.

It is to be noted that a setting of the zoom magnification, a switch of the image, etc. may be performed by the measurement control unit 45, and an image display may be also performed by the display unit 53.

(Step 03) In a case where the prism 9 deviates from an optical tracking range under a condition where the optical tracking is performed, the tracking control unit 60 judges that it is impossible to perform the optical tracking and switches to the image tracking. The image tracking is executed in parallel with the optical tracking, and the flying vehicle system 2 in the image is detected. A position of the flying vehicle system 2 within the image is obtained, and the horizontal rotation driving unit 51 and the vertical rotation driving unit 52 are controlled so that the optical axis of the camera unit 46 is directed toward this position.

It is to be noted that in a case where the image tracking is performed, in order to widen the tracking range, the magnification of the optical zoom may be reduced by a predetermined value at a moment where the tracking is switched to the image tracking.

Figure 8A:
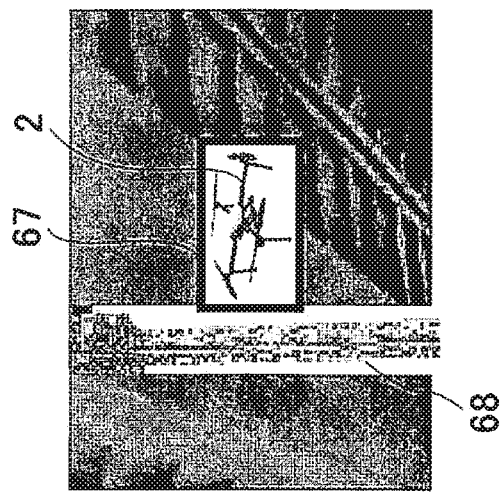
FIG. 8A, FIG. 8B and FIG. 8C are explanatory drawings of a condition where an image tracking is executed.
Figure 8B:
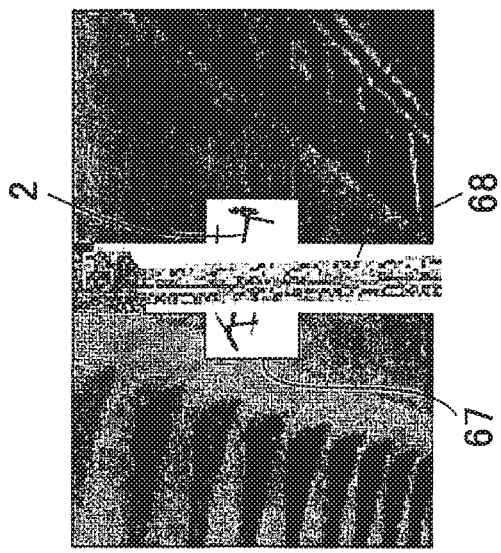
Figure 8C:
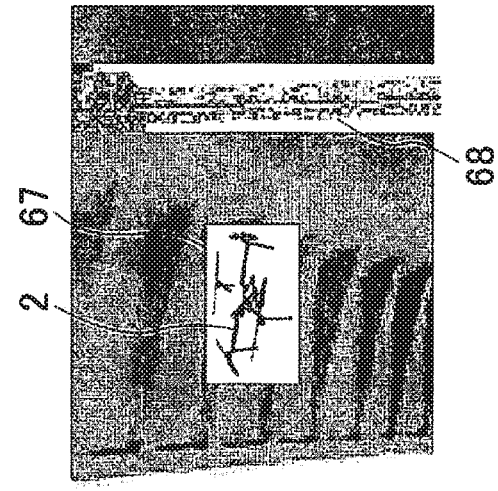

FIG. 8A to FIG. 8C show a condition of the image tracking in a case where the flying vehicle system 2 flies under a bridge. A brief description will be given below on the image tracking. In FIG. 8A to FIG. 8C, reference numeral 67 denotes a window for image tracking for extracting and detecting the flying vehicle system 2. The position measuring instrument 3 captures the flying vehicle system 2 via the window 67 for image tracking and performs the image tracking.

FIG. 8A shows a condition where the flying vehicle system 2 is captured via the window 67 for image tracking, and the image tracking is executed. FIG. 8B shows a condition where an obstacle 68 exists between the flying vehicle system 2 and the position measuring instrument 3, the flying vehicle system 2 to be extracted do not exist in the image, and the image tracking cannot be performed. Further, FIG. 8C shows a condition where the image tracking can be performed again in a condition where the flying vehicle system 2 is extracted from the image and the flying vehicle system 2 is recognized, for instance, by a template matching, in a case where a lost flying vehicle system 2 appears again in the image.

(Step 04) In a case where the flying vehicle system 2 cannot be detected even by the image tracking, the tracking control unit 60 judges that it is impossible to perform the optical tracking or it is not possible to return to the optical tracking, and positional data of a last position where the optical tracking was performed (i.e. a position where the optical tracking can be performed) is acquired. The flying vehicle control device 35 controls so as to make the flying vehicle system 2 return to the last position.

The flying vehicle control device 35 regards a positional information obtained at a last time as the last position, and the present position of the flying vehicle system 2 with respect to the last position is obtained by the IMU 40. It is to be noted that the last position as obtained by the position measuring instrument 3 is a position where the flying vehicle system 2 was measured and a positional information was transmitted to the flying vehicle system 2 at the last time and is same as a positional information obtained by the flying vehicle control device 35 at the last time.

Based on the present position obtained by the IMU 40 (hereinafter referred as "present position of IMU"), a distance and a direction for returning to the last position are calculated. The flying vehicle system 2 flies autonomously to the last position based on a present positional information of the IMU of the flying vehicle system 2 as obtained by the IMU 40.

It is to be noted that under a condition where neither the optical tracking nor the image tracking can be performed, the flying vehicle system 2 cannot obtain a positional information from the position measuring instrument 3. In order to prevent a straying of the flying vehicle system 2 in a case where the positional information cannot be obtained, the flying vehicle control device 35 performs a hovering control of the flying vehicle system 2 until the positional information can be obtained.

(Step 05) When the flying vehicle system 2 returns to the last position based on the positional information of the IMU 40, it is judged by the tracking control unit 60 whether or not the optical tracking can be performed and whether or not the image tracking can be performed. In a case where it is judged that the optical tracking can be performed, the optical tracking is resumed immediately. Further, in a case where it is judged that the optical tracking cannot be performed but the image tracking can be performed, the flying vehicle system 2 is extracted from an image as photographed at the last position.

When the flying vehicle system 2 is extracted, the position of the flying vehicle system 2 is calculated from the image. The camera unit 46 is directed toward the position of the flying vehicle system 2 as calculated, and the image tracking or the optical tracking is resumed.

Further, in a case where neither the optical tracking nor the image tracking can be performed, i.e., in a case where the flying vehicle system 2 goes off course by a strong wind, or the like, or in a case where the flying vehicle system 2 hides behind a large structure, etc., the ground base station 4 issues an alarm to the operator that it is impossible to perform the tracking.

In this case, the operator judges a safe and reliable returning position of the flying vehicle system 2 from the image and designates the returning position on the image. A designation on the image may be performed by a designation by a cursor or by tapping the display. A designated position as designated on the image is calculated by the control device 63, is transmitted to the flying vehicle system 2 as the position to be returned, and is transmitted to the position measuring instrument 3 as a position to be sighted.

(Step 06) The flying vehicle system 2 moves to the designated position based on the designated position as received and on the present positional information of the IMU as obtained by the IMU 40. Further, the position measuring instrument 3 rotates the camera unit 46 so that the designated position is sighted.

When the camera unit 46 is directed toward the last position or the designated position, and the flying vehicle system 2 is moved to the last position or the designated position, the camera unit 46 can capture the flying vehicle system 2, and the flying vehicle system 2 can return to a condition where the image tracking or the optical tracking can be performed.

(Step 01) The flying vehicle system 2 returns from a condition capable of the image tracking or a condition capable of the optical tracking to the optical tracking, the optical tracking is resumed, and the autonomous flight is executed by the positional information as obtained by the position measuring instrument 3. It is to be noted that it may be arranged in such a manner that the non-prism measurement mode is set and the autonomous flight may be executed at a moment when the flying vehicle system 2 returns to the condition capable of the image tracking.

(Step 03, Step 07) The optical tracking is continued, and the autonomous flight of the flying vehicle system 2 is continued based on the positional information as transmitted from the position measuring instrument 3.

(Step 08) When the autonomous flight is executed based on the flight plan, and the flight plan is completed, the flying vehicle system 2 returns to a predetermined position, for instance, a position where the position measuring instrument 3 is installed, and the flight is finished.

In general, in the optical tracking, since the tracking range is narrow, in a case where the prism to be tracked is lost, it takes much time to perform the prism scanning and to return to the tracking condition. However, since the image tracking is carried out in parallel in the present embodiment, even in a case where the prism is lost from the sight during the optical tracking, the prism can be captured easily by the image tracking, and it is possible to return to the optical tracking in a short time.

Further, under a condition where the image tracking is performed, it may be so arranged that the measurement mode is switched from the prism measurement mode to the non-prism measurement mode, the flying vehicle system 2 is measured in the non-prism measurement mode, and the position of the flying vehicle system 2 is determined.

Further, in a case where the positional information of the flying vehicle system 2 is obtained by the optical tracking and the image tracking, the GPS device 8 can be omitted.

The invention claimed is:

1. A flying vehicle tracking method comprising: using a position measuring instrument capable of performing both image tracking and optical tracking, wherein during said optical tracking, a tracking light is projected through an optical system of said position measuring instrument to a prism located on a flying vehicle, said tracking light is received through said optical system, and a tracking of said prism of said flying vehicle is performed based on a light receiving result, and wherein during said image tracking, an image of said flying vehicle is acquired through said optical system, said flying vehicle is detected from said image, and the tracking of said flying vehicle is performed based on a detection result, wherein said optical tracking and said image tracking are executed in parallel with each other, and in a case where said prism of said flying vehicle cannot be tracked by said optical tracking, a local prism scanning is executed based on an approximate position of said flying vehicle as detected in said image tracking, wherein during local prism scanning, a position of said flying vehicle within the image is obtained and a horizontal rotation driving unit and a vertical rotation driving unit are controlled so that the optical axis of said optical system is directed toward said position, and said optical tracking is reestablished based on said prism, wherein a position of the prism is specified by the local prism scanning.

2. The flying vehicle tracking method according to claim 1, wherein said flying vehicle has an inertial measurement unit, and in a case where said optical tracking and said image tracking cannot be performed, said flying vehicle moves to a last position tracked by said optical tracking or said image tracking based on a positional information obtained by said inertial measurement unit, and said image tracking or said optical tracking is reestablished.

3. A flying vehicle image acquiring method comprising: a position measuring instrument, capable of performing both image tracking and optical tracking, and a ground base station, wherein said position measuring instrument has a camera unit with a zoom function, acquires an image of a flying vehicle, and is capable of performing a distance measurement and an angle measurement and of tracking said flying vehicle via an optical system of said camera unit, wherein said ground base station controls a flight of said flying vehicle based on a measurement result of said position measuring instrument, and wherein said ground base station controls said camera unit based on the measurement result of said position measuring instrument and controls a magnification of an optical zoom so that a size of said flying vehicle will be constant on said image.

4. A flying vehicle displaying method comprising: a position measuring instrument, capable of performing both image tracking and optical tracking, and a ground base station, wherein said position measuring instrument has a camera unit, acquires an image of a flying vehicle, and is capable of performing a distance measurement and an angle measurement and of tracking said flying vehicle via an optical system of said camera unit, wherein said ground base station controls a flight of said flying vehicle based on a measurement result of said position measuring instrument, and wherein said ground base station includes a display unit for displaying an image photographed by said camera unit, controls a magnification of a digital zoom of said display unit and displays said flying vehicle on said display unit so that a size of said flying vehicle will be constant on an image based on the measurement result of said position measuring instrument.

5. The flying vehicle displaying method according to claim 4, wherein the image displayed on said display unit can be switched to a display of only said flying vehicle or a display including surroundings of said flying vehicle.

6. The flying vehicle displaying method according to claim 4, wherein said camera unit has two zoom functions of an optical zoom and a digital zoom, wherein a magnification of the optical zoom is changed so that the size of said flying vehicle will be constant on the image corresponding to a measured distance, and a switching of the display of only said flying vehicle and the display including the surroundings of said flying vehicle is carried out by the digital zoom.

7. A flying vehicle guiding system comprising: a flying vehicle system capable of being remotely controlled, a position measuring instrument, capable of performing both image tracking and optical tracking, and of tracking said flying vehicle system, and a ground base station for controlling a flight of said flying vehicle system based on a measurement result of said position measuring instrument, wherein said flying vehicle system comprises a prism and a flying vehicle control device, wherein said position measuring instrument comprises a camera unit for sighting and photographing said flying vehicle system, a distance measuring unit for performing a prism measurement and a non-prism measurement via an optical system of said camera unit, angle detectors for detecting an angle in a sighting direction, and a measurement control unit, wherein said measurement control unit has a tracking control unit for performing said optical tracking by receiving a reflected light from said prism and for performing said image tracking by extracting said flying vehicle system from an image photographed by said camera unit, an image pickup control unit for controlling a photographing condition of said camera unit, a position measurement communication unit, and an image processing unit for detecting said flying vehicle system from the image acquired by said camera unit, wherein said ground base station has a control device and a base communication unit, wherein said measurement control unit executes said optical tracking and said image tracking in parallel with each other with respect to said flying vehicle system, executes a tracking control of said flying vehicle system by putting priority on a result of said optical tracking, and executes the tracking control of said flying vehicle system by said image tracking when said prism of said flying vehicle cannot be tracked by said optical tracking, executes a local prism scanning based on an approximate position of said flying vehicle as detected in said image tracking, wherein during local prism scanning, a position of said flying vehicle within the image is obtained and a horizontal rotation driving unit and a vertical rotation driving unit are controlled so that the optical axis of said optical system is directed toward said position, said optical tracking is reestablished based on said prism, wherein a position of the prism is specified by the local prism scanning, and a distance measurement result obtained in a process of said optical tracking is transmitted to said flying vehicle control device as a positional information, and wherein said flying vehicle control device makes said flying vehicle system fly based on said positional information.

8. The flying vehicle guiding system according to claim 7, wherein said position measuring instrument performs a measurement of said flying vehicle system by the non-prism measurement under a condition where an image tracking control is executed, and said flying vehicle control device makes said flying vehicle system fly based on a positional information by the non-prism measurement.

9. The flying vehicle guiding system according to claim 7, wherein said flying vehicle system further comprises an inertial measurement unit and measures a present position of said flying vehicle system with respect to a positional information transmitted from said position measuring instrument by said inertial measurement unit, and wherein said flying vehicle control device makes said flying vehicle system fly toward a last position obtained by a tracking based on a positional information obtained from said inertial measurement unit in a case where said optical tracking and said image tracking cannot be performed.

10. The flying vehicle guiding system according to claim 7, wherein said position measuring instrument has an operation unit, said flying vehicle system further comprises an inertial measurement unit, and wherein in a case where said optical tracking and said image tracking cannot be perform, a position capable of being tracked is designated by said operation unit, said flying vehicle control device makes said flying vehicle system fly toward a position designated based on the positional information obtained from said inertial measurement unit, and said measurement control unit makes said camera unit sight the designated position.

* * * * *